US010350739B2

(12) United States Patent
Newberry

(10) Patent No.: US 10,350,739 B2
(45) Date of Patent: Jul. 16, 2019

(54) EXPANDER PISTON RING OVERLAP PROTECTION AND METHODS OF USE

(71) Applicant: Toyota Motor Engineering & Manufacturing North America, Inc., Erlanger, KY (US)

(72) Inventor: David W. Newberry, Gallipolis, OH (US)

(73) Assignee: Toyota Motor Engineering & Manufacturing North America, Plano, TX (US)

( * ) Notice: Subject to any disclaimer, the term of this patent is extended or adjusted under 35 U.S.C. 154(b) by 497 days.

(21) Appl. No.: 15/047,979

(22) Filed: Feb. 19, 2016

(65) Prior Publication Data

US 2017/0239797 A1 Aug. 24, 2017

(51) Int. Cl.
*F16J 9/00* (2006.01)
*B25B 27/12* (2006.01)

(52) U.S. Cl.
CPC ................ *B25B 27/12* (2013.01); *F16J 9/00* (2013.01)

(58) Field of Classification Search
CPC . F16J 9/00; B23P 19/088; B23P 21/00; Y10T 29/536
See application file for complete search history.

(56) References Cited

U.S. PATENT DOCUMENTS

| | | | | |
|---|---|---|---|---|
| 1,544,974 | A | 7/1925 | Gillis | |
| 5,283,478 | A | 2/1994 | Maloberti et al. | |
| 5,303,465 | A | 4/1994 | Fujimoto et al. | |
| 5,588,208 | A * | 12/1996 | Sato | B23P 19/088 29/222 |
| 9,334,866 | B2 * | 5/2016 | Gilarranz | F04D 29/051 |
| 2015/0204149 | A1 * | 7/2015 | O'Reilly | E21B 7/04 175/45 |

FOREIGN PATENT DOCUMENTS

| | | |
|---|---|---|
| CN | 2675884 Y | 2/2005 |
| CN | 2794759 Y | 7/2006 |

* cited by examiner

*Primary Examiner* — Jacob J Cigna
*Assistant Examiner* — Lee A Holly
(74) *Attorney, Agent, or Firm* — Dinsmore & Shohl LLP

(57) ABSTRACT

Methods and apparatuses for installing a piston ring onto a piston include a piston ring feeder having at least one projection feature and a receiving aperture. Methods include receiving a piston end having a piston groove into the receiving aperture until the piston groove is above piston rings on the piston ring feeder and below projection feature top ends; raising a ring to partially snap into the piston groove with ring ends separated by a first projection feature and the ring wrapped around a second projection feature; raising the piston such that the ring is pulled off the second projection feature while the first projection feature separates the ring ends; and raising the piston such that the first projection feature releases the ring ends and the ring fully snaps into the piston groove to form a gap between the ring ends of the ring seated in the piston groove.

20 Claims, 17 Drawing Sheets

EXPANDER PISTON RING OVERLAP PROTECTION AND METHODS OF USE

TECHNICAL FIELD

The present specification generally relates to overlap protection for ends of piston rings and methods of use, and more specifically, to a piston ring feeder comprising a pair of projection features to install an expander piston ring onto a piston such that separate, expanded split ends of the expander piston ring are protected against overlapping when snapping hack together during placement within a groove of the piston.

BACKGROUND

An expander piston ring is a split ring that fits into a groove formed within an outer diameter of a piston in a reciprocating engine, such as an internal combustion engine. Main functions of piston rings in reciprocating engines may include sealing a combustion chamber of the engine so that there is no transfer of gases from the combustion chamber to a crank of the engine, supporting heat transfer from the piston to a cylinder wall of the engine within which the piston is seated, and regulating engine oil consumption (e.g., via a sealing functionality).

In order that a ring may be fitted into the grooves of the piston, the ring is not continuous but is broken at one point of the ring's circumference such that the ring is expandable and includes separate opposing ends that may become spaced apart from one another. An end gap in a piston ring should compress to a few thousandths of an inch when inside the cylinder bore e.g., when within the space across the diameter of the cylinder wall). When fitting new piston rings or breaking them within an engine, the end gap is a crucial measurement. Such expander piston rings that expand such that the ends are spaced apart from one another may be fed into the groove in a manner that results, however, in an overlap rather than an end gap between separate opposing ends of the piston rings.

Accordingly, a need exists for alternative piston ring feeding methods and apparatuses such that piston rings may be fed into piston grooves without resulting in an overlap between separate opposing ends of the piston rings.

SUMMARY

In one embodiment, a piston ring feeder may include a first end and a second end and a cylindrical body disposed therebetween; a pair of projection features including a first projection feature and a second projection feature, each having portions protruding from and attachable to the first end, and each disposed at a respective area along opposite half portions of the piston ring feeder; and a piston receiving aperture defined by an inner wall of the first end. At least a portion of the cylindrical body tapers upward and outward in a direction from the second end toward the first end.

In another embodiment, a method for installing a piston ring onto a piston may include disposing one or more piston rings on an outer periphery wall of a piston ring feeder. The piston ring feeder may include a first end and a second end and a cylindrical body disposed therebetween; a pair of projection features including a first projection feature and a second projection feature; and a piston receiving aperture defined by an inner wall of the first end. The cylindrical body includes the outer periphery wall and at least a portion of the cylindrical body tapers upward and outward in a direction from the second end toward the first end. Each of the pair of projection features have portions protruding from and attachable to the first end, and each are disposed at a respective area along opposite half portions of the piston ring feeder. The method may further include receiving an end of the piston including a piston groove into the piston receiving aperture until the piston groove is disposed above the one or more piston rings and below top ends of the pair of projection features; raising at least a first piston ring of the one or more piston rings until the first piston ring partially snaps into the piston groove such that a first end and a second end of the first piston ring are separated by the first projection feature and a second portion of the first piston ring is wrapped around an exterior portion of the second projection feature; raising the piston such that the second portion of the first piston ring is pulled away from and off the exterior portion of the second projection feature while the first projection feature continues to separate the first and second ends of the first piston ring; and raising the piston such that the first projection feature releases the first and second ends of the first piston ring such that the first piston ring fully snaps into the piston groove to form an end gap defined between the first and second ends of the first piston ring seated in the piston groove.

In another embodiment, a piston ring feeder may include a first end and a second end and a cylindrical body disposed therebetween; a rear projection feature has a portion protruding from and attachable to the first end and is disposed at an area along a rear half portion of the piston ring feeder; and a piston receiving aperture defined by an inner wall of the first end. At least a portion of the cylindrical body tapers upward and outward in a direction from the second end toward the first end. The rear projection feature is upwardly tapered.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
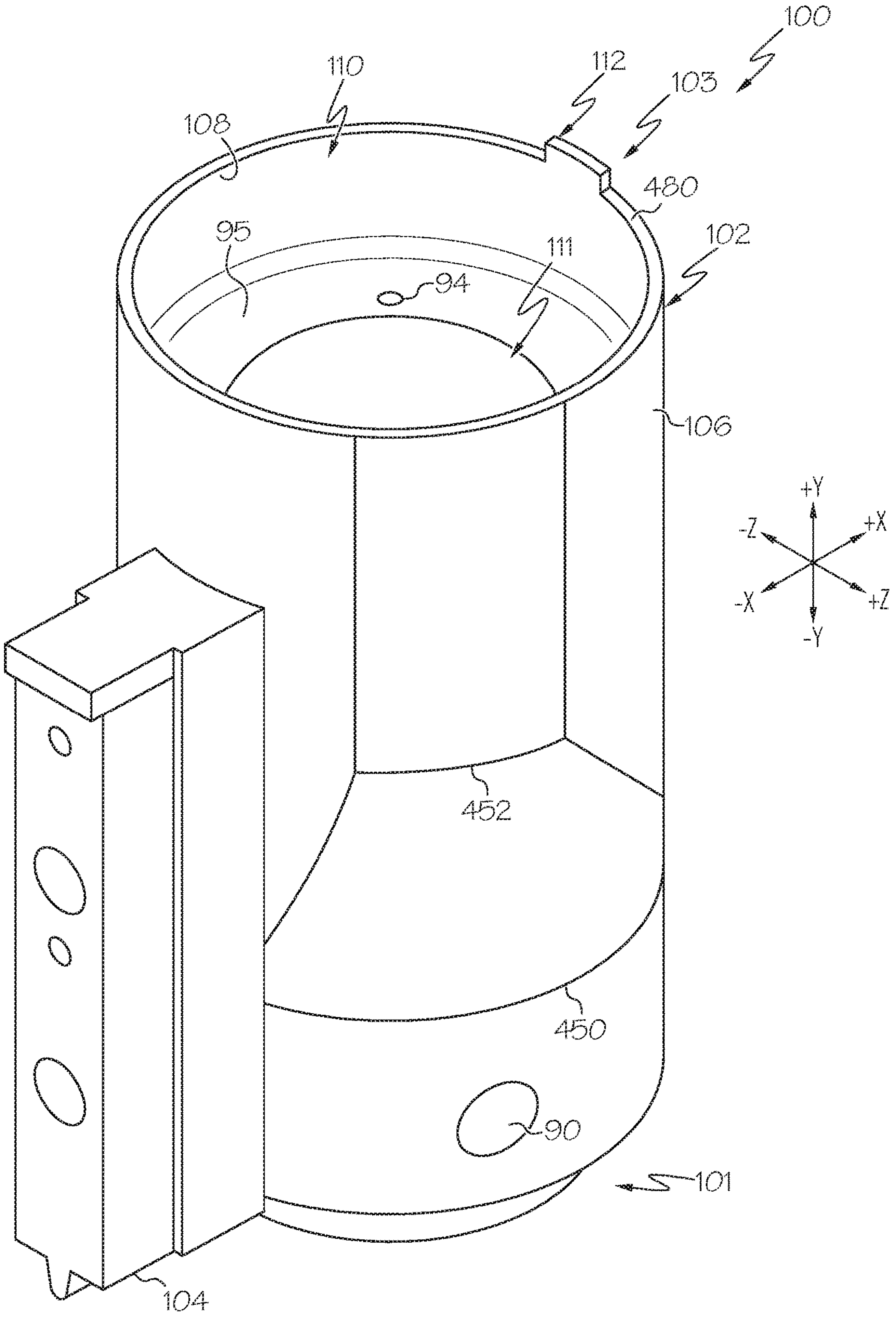
FIG. 1 schematically illustrates an isometric view of a piston ring feeder having a rear projection feature and an attached mounting bracket, according to one or more embodiments shown and described herein.

Reference will now be made in detail to embodiments of piston ring feeders and methods of use to place expander piston rings into respective piston grooves of a piston such that separate ends of the expander piston rings are prevented and protected from overlapping during such placement, examples of which are illustrated in the accompanying drawings. Whenever possible, the same reference numerals will be used throughout the drawings to refer to the same or like parts. Various embodiments of piston ring feeders will be described in further detail herein with specific reference to the appended drawings.

Generally, piston ring feeders feed expander piston rings having split ends into respective piston grooves of one or more pistons. Due to a potential "whip lash" effect when a portion of an expander piston ring is pulled from a projection feature atop a piston ring feeder, the split ends of the expander piston ring may overlap with one another within the piston groove of the piston and may thus result in a failure of the piston assembly within the engine. In embodiments described herein, a rear projection feature may have a height and/or tapering to help reduce the whip lash effect by reducing instances of such overlapping of split ends of the expander piston rings within the piston grooves of the pistons, as described in greater detail further below. Additionally, a front projection feature may have a height to help reduce the whip lash effect and may operate to trap the split ends of the expander piston ring when the expander piston ring is pulled off the rear projection feature such that overlapping of the split ends within the piston groove is prevented while the whip lash effect occurs. Thus, expander piston rings may be fully seated within respective piston grooves by use of the piston ring feeders described herein such that split ends of the expander piston rings are prevented from overlapping when being fully seated in their respective piston groove positions.

FIG. 1 generally depicts an embodiment of a piston ring feeder 100, which may be made of, for example, stainless steel or like suitable materials that are within the scope of this disclosure. As described herein, a rearward-forward (e.g., back-to-front) direction of the piston ring feeder 100 is associated with the +/−X-direction depicted in FIG. 1. An upward-downward (e.g., top-bottom) direction of the piston ring feeder 100 is associated with the +/−Y-direction depicted in FIG. 1. A lateral direction of the piston ring feeder 100 is associated with the +/−vehicle Z-direction depicted in FIG. 1, and is transverse to the forward-rearward direction. A positive (+) Z-direction faces toward a lateral portion that is to the right of the front of the piston ring feeder 100, and a negative (−) Z-direction faces toward a lateral portion that is to the left of the front of the piston ring feeder 100. Further, the terms "front," "forward," "inward," "inner," "upward," "downward," "rear," "rearward," "outward," and "outer" are used herein to describe the relative positioning of various components of the piston ring feeder.

Figure 4A:
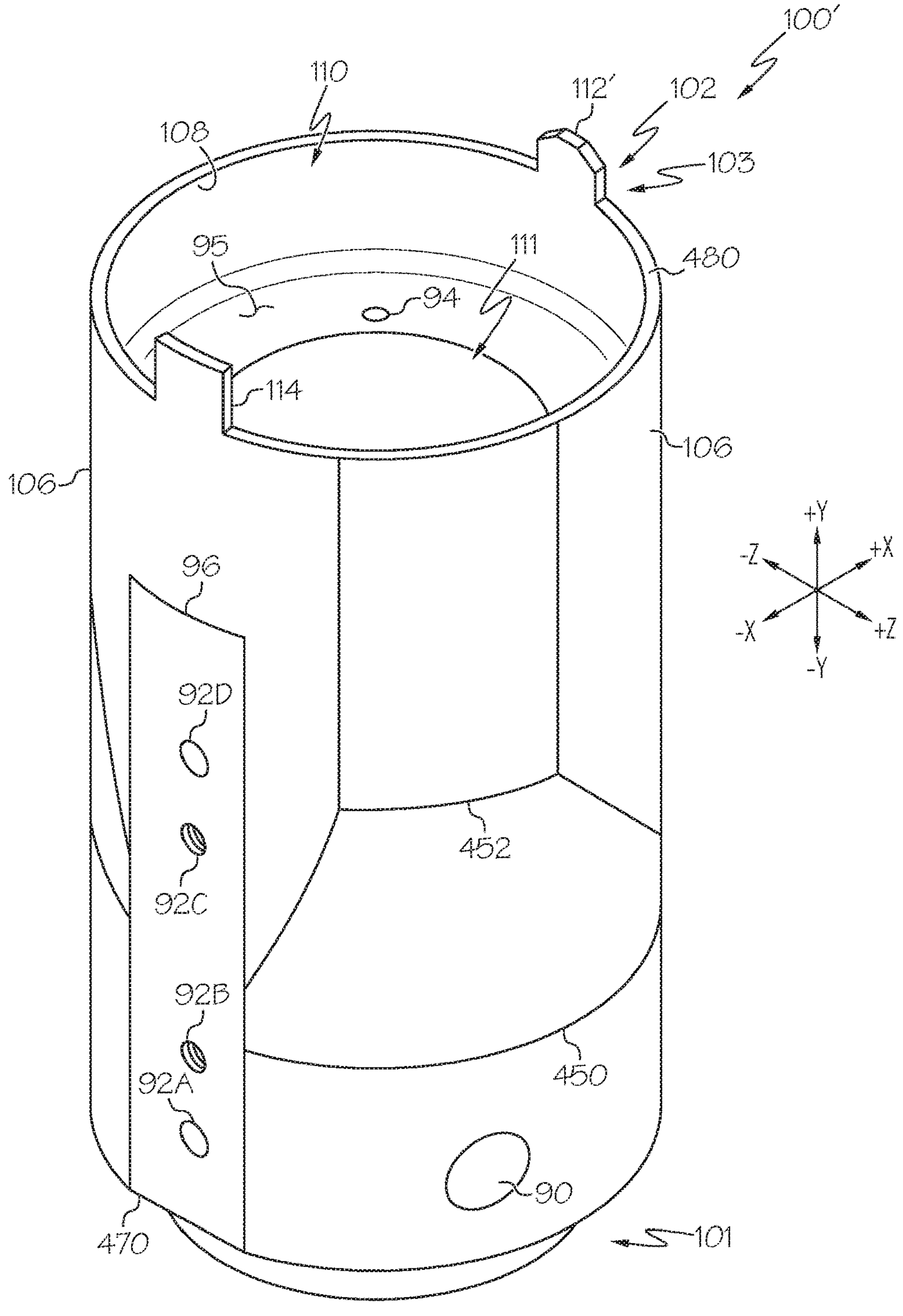
FIG. 4A schematically illustrates an isometric view of the piston ring feeder of FIG. 3 without the attached mounting bracket, according to one or more embodiments shown and described herein.

The piston ring feeder 100 of FIG. 1 includes a first, top end 103, and a second, bottom end 101 opposite the top end 103, and a cylindrical body 102 disposed therebetween. As used herein, the term "cylindrical body" refers to a generally cylindrical shape, but not necessarily circular in cross-section. For example, the cylindrical body may be an octagonal or other suitable polygonal shape. Further, the cylindrical body may have one or more sections that are not generally cylindrical in shape. A portion of the cylindrical body 102 between sections 450, 452 (described in greater detail further below) may taper in an upward and outward direction from the second end 101 to the first end 103 to increase a width of the cylindrical body 102, as will be described in greater detail further below. The piston ring feeder 100 includes an outer periphery wall 106 and an inner periphery having an inner wall 108 that defines a piston receiving aperture 110. A top surface 480 is defined between the inner wall 108 and the outer periphery wall 106 at the first end 103 of the cylindrical body 102. The piston ring feeder 100 of FIG. 1 includes a projection feature 112 that may be, for example, a rear castle projection extending upwardly from the first end 103 of the cylindrical body 102. The projection feature 112 may have a length in a range of from about 2.50 mm to about 15.00 mm, for example. The projection feature 112 may be integral with or attachable to the first end 103 of the cylindrical body 102 and disposed along a rear half portion of the piston ring feeder 100. The piston ring feeder 100 may include a mounting bracket 104 that attaches to the piston ring feeder 100 to attach the piston ring feeder to a piston ring feeder holding assembly via one or more attachment openings such as apertures or blind bores to receive bolts, magnets, and/or other attachment features (FIG. 4A). As described in greater detail below, the cylindrical body 102 further includes one or more apertures 90 and an inner ridge 95 that is disposed between the inner wall 108 and an interior inner bore wall 111 and that has one or more blind bores 94

Figure 2A:
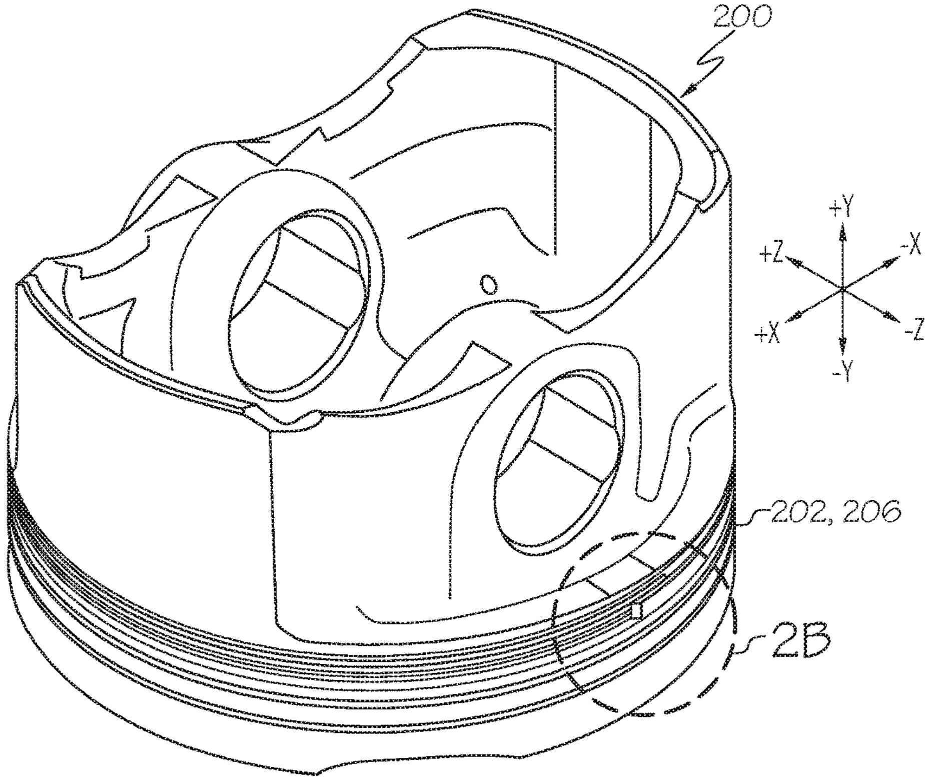
FIG. 2A schematically illustrates a detail, isometric view of a piston onto which the piston ring feeder of FIG. 1 has placed a piston ring, according to one or more embodiments shown and described herein.
Figure 2B:
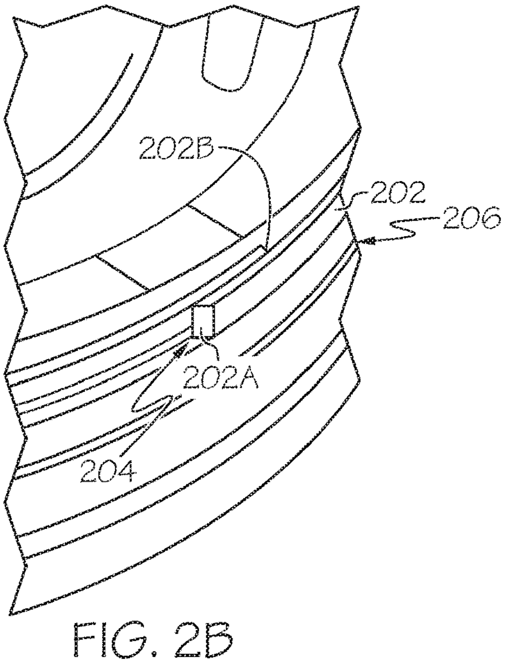
FIG. 2B schematically illustrates a detail view of the piston in area 2B of FIG. 2A showing an overlap of the piston ring, according to one or more embodiments shown and described herein.

FIG. 2A schematically illustrates a detail view of a piston 200 onto which the piston ring feeder 100 of FIG. 1 has placed a piston ring 202 within a piston groove 206, and FIG. 2B is a more detailed view of a portion of the piston 200 of FIG. 2A that shows an overlap of ends 202A, 202B of the piston ring 202. For example, referring to FIG. 2B, two split ends 202A and 202B of the piston ring 202 overlap at an overlapping area 204 within the piston groove 206.

The piston ring 202 is an expander piston ring that is split such that ends 202A and 202B may be separated from one another. When the piston ring feeder 100 is used to feed the piston ring 202 into the groove 206 of the piston 200, the piston ring 202 is raised from the piston ring feeder (via, for example, a motor and sensor assembly), with the expanded ends 202A and 202B separated around the outer periphery wall 106 of the cylindrical body 102 of the piston ring feeder 100 (FIG. 1). The piston ring 202 partially snaps into the piston groove 206 and extends over an exterior portion of the projection feature 112. As the piston 200 is raised, the piston ring 202 is lifted from and pulled off the projection feature 112, which may cause an oppositely placed portion of the ring (e.g., the portion including the end gap via a spacing between the ends 202A and 202B of the piston ring 202) to have a "whip lash" effect. For example, one or both of the ends 202A, 202B may whip out and then snap back into the piston groove 206 such that one end 202A overlaps with the other end 202B as shown in the overlapping area 204 of FIG. 2B. Such an overlap, as presented by the overlapping area 204, may be undesirable, such that the piston 200 may not be able to be properly assembled and functional within a cylinder wall of a reciprocating engine.

Figure 3:
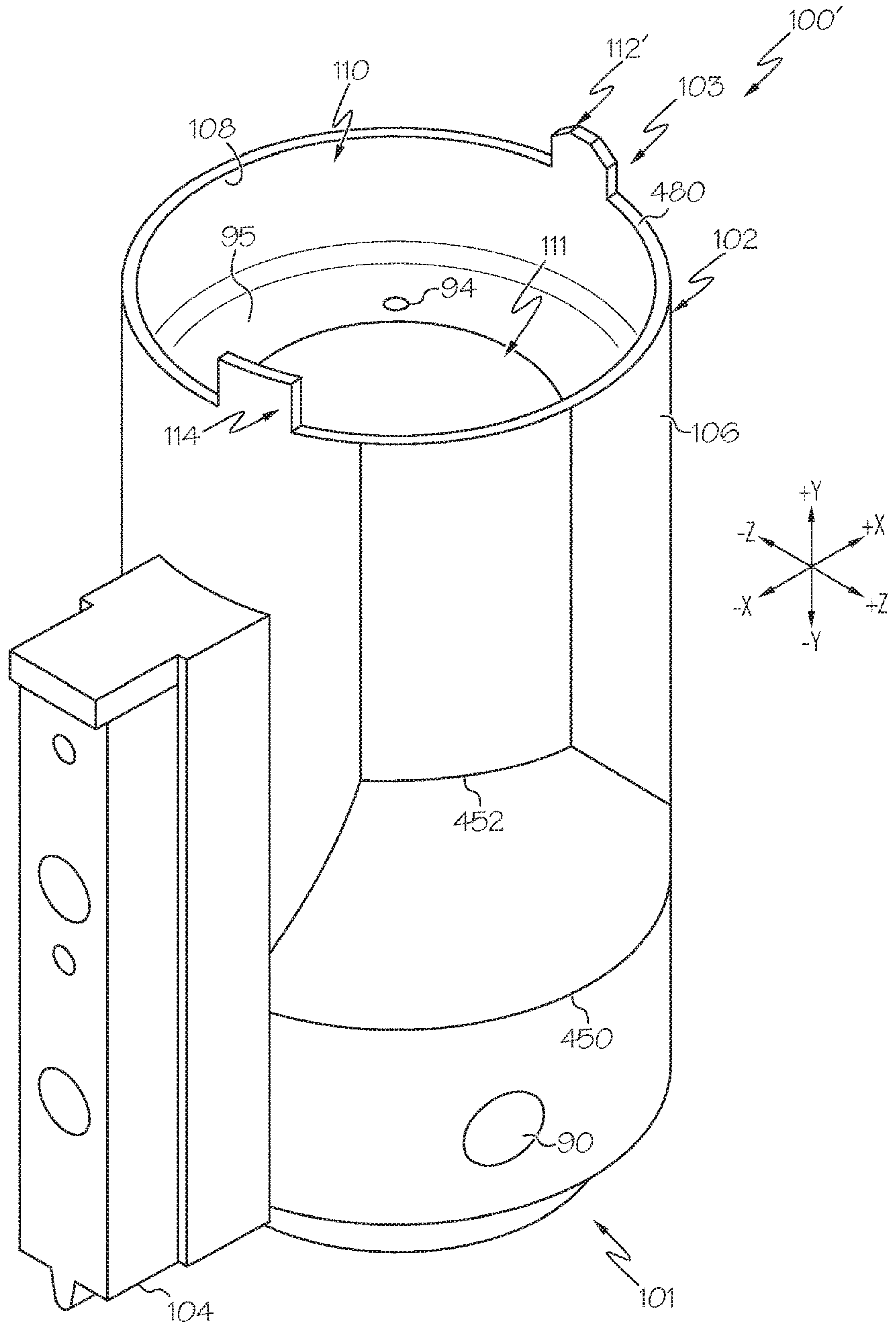
FIG. 3 schematically illustrates an isometric view of another piston ring feeder having a front projection feature, a tapered rear projection feature, and an attached mounting bracket, according to one or more embodiments shown and described herein.

To prevent the overlapping area 204 from occurring, the projection feature 112 may have a raised height of between about 10 mm and about 20 mm, such as about 15.00 mm, for example, and/or may be tapered in height as shown in FIG. 3. Such tapering of the projection feature 112 rather than having sharper, wider end portions allows for a reduction in a diameter of the piston ring 202 as it is raised over the tapered protection feature 112. Such a reduction in piston ring diameter allows for a reduction in force in the whip lash effect when the piston ring 202 is eventually pulled off the projection feature 112 to be fully seated within the piston groove 206. The reduction in force may prevent the ends 202A, 202B of the piston ring 202 from overlapping within the piston groove 206.

FIG. 3 shows yet another alternative embodiment of a piston ring feeder 100' that is similar to the piston ring feeder 100 except that the piston ring feeder 100' includes an additional first projection feature 114 along with a tapered, second projection feature 112'. The pair of projection features 112', 114 have portions that protrude from and are integral with or attachable to the first end 103 of the piston ring feeder 100'. Each of the projection features 112', 114 are disposed at a respective area along opposite half portions of the piston ring feeder 100'. For example, second projection feature 112' may be a rear castle projection that is disposed along a respective rear portion of the piston ring feeder 100', and the first projection feature 114 may be a front castle projection that is disposed along a respective front portion of the piston ring feeder 100'. In embodiments, the first projection feature 114 may be disposed on a front portion of the piston ring feeder 100' in a first, front position that is directly opposite to a rear portion of the piston ring feeder 100' on which the second projection feature 112' is disposed in a second, rear position. Thus, the first projection feature 114 may be disposed on a front portion of the piston ring feeder 100' while the second projection feature 112' is disposed on an oppositely-opposed rear portion position of the piston ring feeder 100'. It is to be understood that the such arrangements may be incorporated for any of the embodiments of the piston ring feeder described herein that have a pair of projection features.

FIG. 4A illustrates the piston ring feeder 100' without the mounting bracket 104 such that a bracket portion of the outer periphery wall 106 of the cylindrical body 102 against which the mounting bracket 104 abuts includes apertures 92A-92D that align with the attachment openings of the mounting bracket 104. The apertures 92A-92D are disposed between a bottom ledge 470 and a top ridge 96 of the bracket portion of the outer periphery wall 106 of the cylindrical body 102. FIG. 4A further illustrates the inner ridge 95 that is disposed between the inner wall 108 and the interior inner bore wall 111 and that has walls defining the one or more blind bores 94. FIG. 4A also illustrates that the cylindrical body 102 includes a tapering that starts at a section 450 of the cylindrical body 102 and ends at a section 452 of the cylindrical body 102 thereby increasing an outer width or diameter of the cylindrical body 102, which will be described in greater detail below.

Figure 4B:
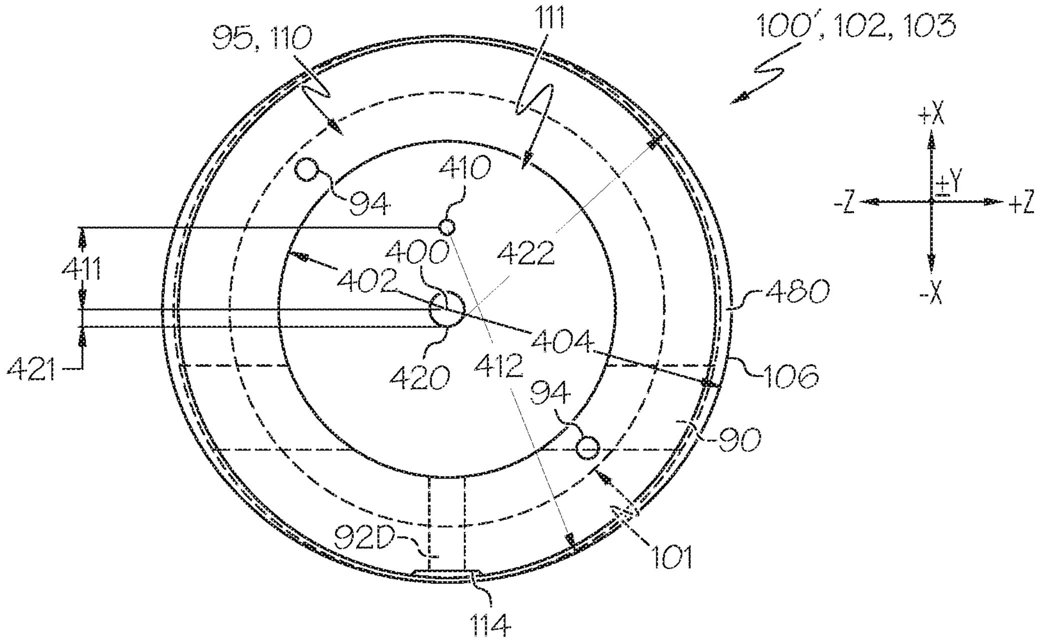
FIG. 4B schematically illustrates a top plan view of the piston ring feeder of FIG. 4A, a tapered rear projection feature, and an attached mounting bracket, according to one or more embodiments shown and described herein.
Figure 4C:
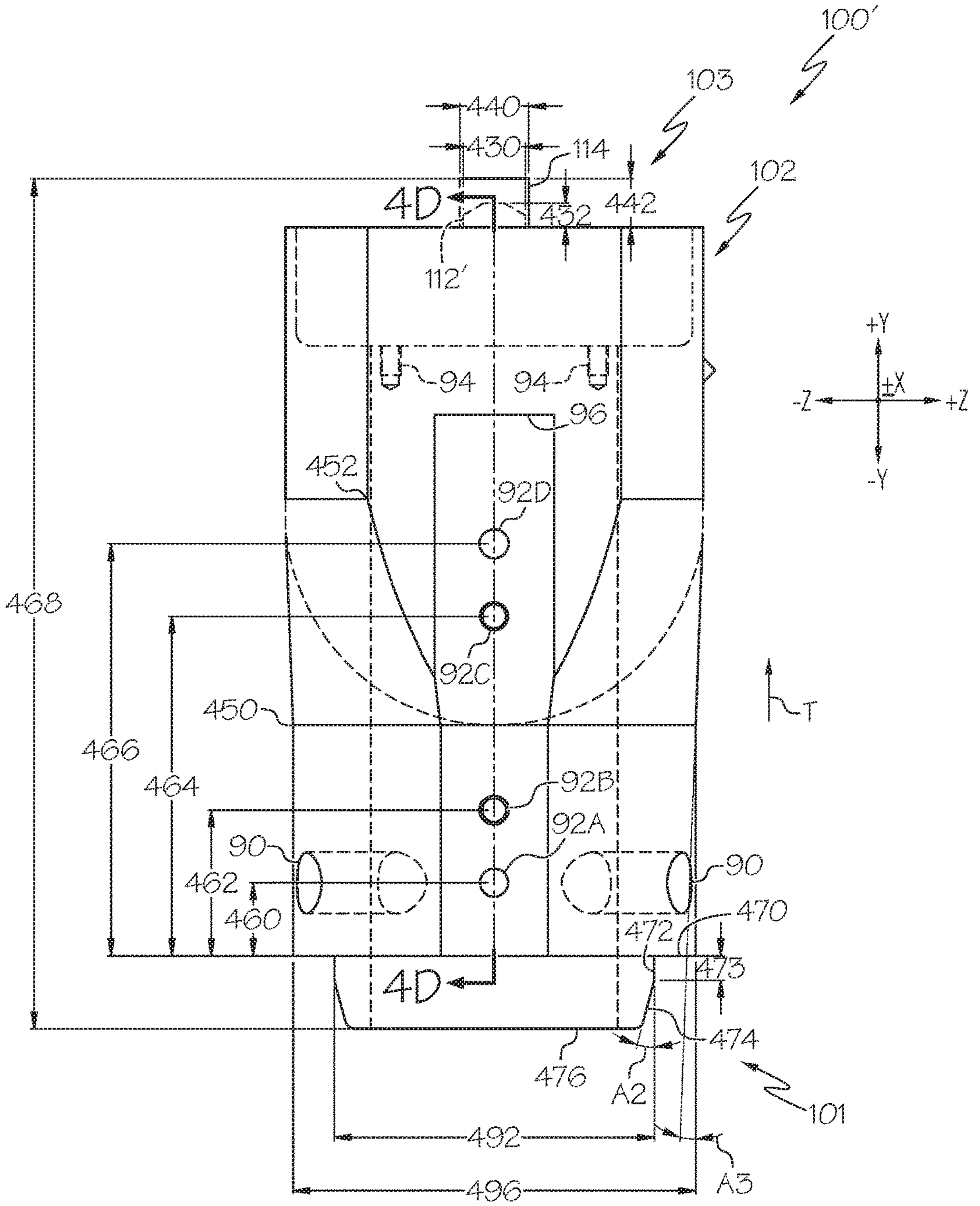
FIG. 4C schematically illustrates a side elevation view of the piston ring feeder of FIG. 4A along with a line 4D-4D, according to one or more embodiments shown and described herein.
Figure 4D:
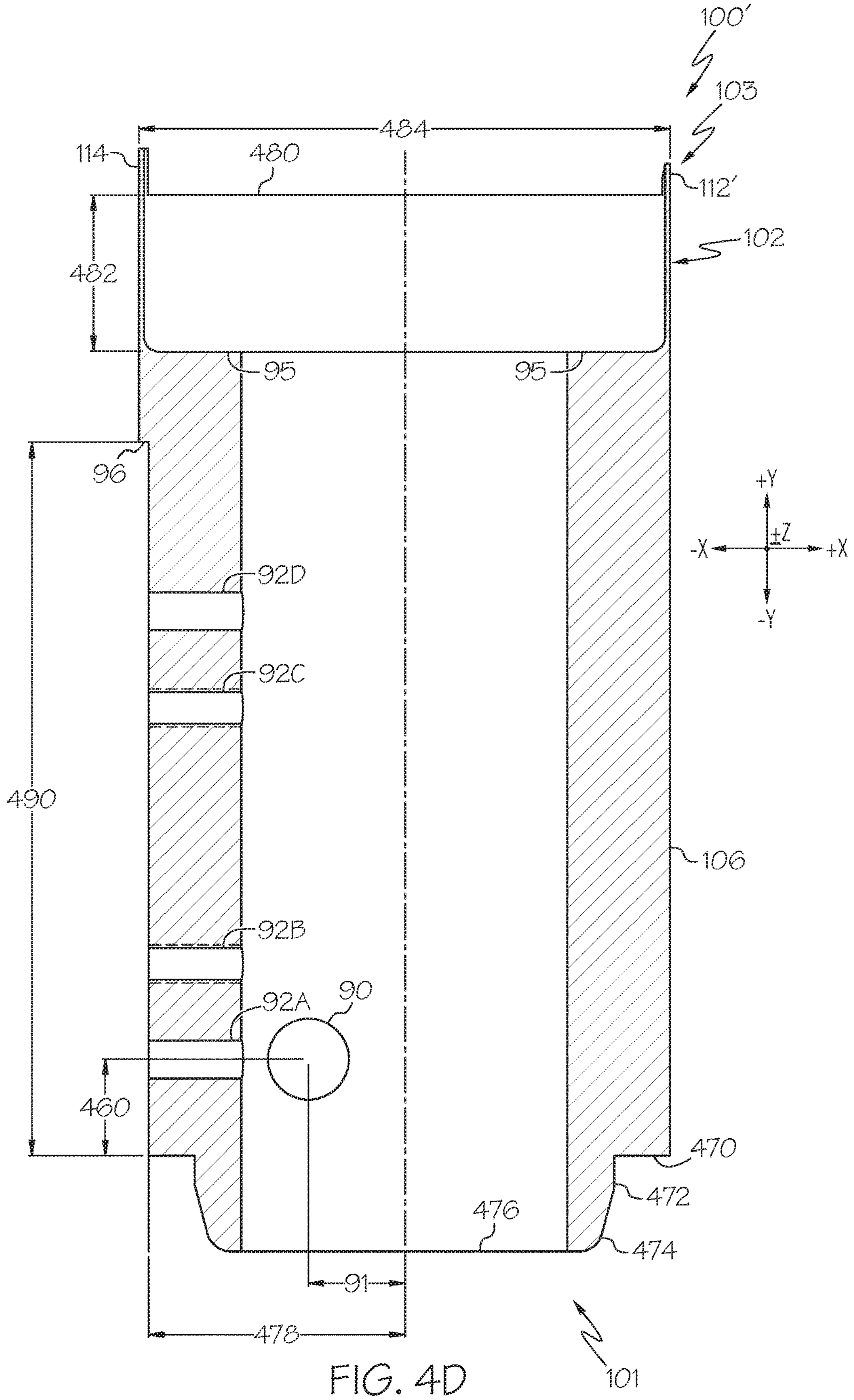
FIG. 4D schematically illustrates a cross-sectional view of the piston ring feeder of FIG. 4A along line 4D-4D of FIG. 4C, according to one or more embodiments shown and described herein.

FIGS. 4B-4D show example dimensions in different perspective views of the piston ring feeder 100'. For example, FIG. 4B shows a top plan view of the piston ring feeder 100', FIG. 4C shows a side elevation view of the piston ring feeder 100' that has a line A-A, and FIG. 4D shows a cross-sectional view along the line A-A of FIG. 4C. The example dimensions described herein may vary by a tolerance from about positive or negative 0.2 mm, about positive or negative 0.1 mm, or about positive or negative 0.05 mm from an example dimension. Any angular dimensions described herein may vary by a tolerance of about positive or negative 0.5 degrees (0.5°).

More specifically, FIG. 4B shows a top plan view of the first end 103 of the cylindrical body 102 of the piston ring feeder 100' and has a center point 400. The center point 400 is a central point of the interior inner bore wall 111 of the cylindrical body 102, for example. The interior inner bore wall 111 may have a diameter 402 of, for example, about 50.80 mm through the center point 400. The outer periphery wall 106 at the first end 103 may have a diameter 404 of, for example, a range of from about 85.97 mm to about 86 mm through the center point 400. The piston ring feeder 100' may have a point 410 that is spaced a distance 411 away from the center point 400 in the +X-direction. The distance 411 may be in a range of from about 9.60 mm to about 9.65 mm away from the center point 400, for example. The outer periphery wall 106 at the first end 103 may have a diameter 412 of, for example, a range of from about 101.97 to about 102.00 mm through the point 410. The piston ring feeder 100' may further have a point 420 that spaced a distance 421 away from the center point 400 in the −X-direction. The distance 421 may be in a range of from about 1.48 mm to about 1.53 mm away from the center point 400, for example. The outer periphery wall 106 at the first end 103 may have a diameter 422 of, for example, a range of from about 85.72 mm to about 85.75 mm through the point 420. Further, the blind bores 94 defined within walls of the inner ridge 95 may be spaced about 21.21 mm away from each of the X-axis and the Z-axis that run through the center point 400.

FIG. 4C shows an elevation view of the piston ring feeder 100' showing the first projection feature 114 as a solid line and the second projection feature 112' as a dashed line to indicate it is hidden behind the first projection feature 114, but to illustrate relative dimensions. The second projection feature 112' may taper along side walls of a length 2.50 mm at a 60.0 degree angle toward a center wall top portion of the second projection feature 112'.

The first projection feature has a width 440 and a length 442. The width 440 may be, for example, 14.00 mm, and the length 442 may be 10.00 mm. The second projection feature 112' has a width 430 and a length 432. The width 430 may be, for example, 12.70 mm, and the length 432 may be 5.00 mm. The length 442 of the first projection feature 114 may be twice that of the length 432 of the second projection feature 112', and the lengths of embodiments of the first projection features may be twice that of the lengths of associated second projection features of the piston ring feeders described herein. In a non-limiting example, the first projection feature 114 and the second projection feature 112' may have raised heights to provide relief and overlapping of ends of the expander pistons rings 202 when snapping into respective piston grooves 206. For example, a second projection feature 112' may have a height in a range of greater than 5.00 mm and less than or equal to 15 mm and/or a first projection feature 114 may have a height in a respective associated range of greater than 10.00 mm and less than or equal to 30 mm. The width 440 of the first projection feature 114 may be sufficiently wide to separate and not interfere with ends 202A, 202B of the piston ring 202 that are otherwise in tension about the cylindrical body 102.

FIG. 4C further illustrates the spacing of the centers of apertures 92A-92D from the bottom ledge 470, which are spacings 460, 462, 464, and 466, respectively. For example, the spacing 460 may be about 15.00 mm, the spacing 462 may be about 30 mm, the spacing 464 may be about 70.00 mm, and/or the spacing 466 may be about 85.00 mm. A spacing 468 from the bottom ledge 470 to a top surface of the first projection feature 114 may be, for example, about 175.10 mm.

FIG. 4C also illustrates a tapering T from the section 450 to the section 452 of the cylindrical body 102 that tapers upwardly and outwardly from the second end 101 to the first end 103 at an angle A3 that may be, for example, about 2 degrees. Ends 202A, 202B of a piston ring 202 may split apart due to tension as the piston ring 202 is raised along the tapering T of the cylindrical body 102.

The second end 101 may further include an upper wall 472 extending distally from the bottom ledge 470, a bottom wall 474 extending distally and tapering inwardly from the upper wall 472, and a bottom surface 476. The upper wall 472 may have a length 473, which may be, for example, about 5.00 mm. The bottom wall 474 may taper inwardly from the upper wall 472 at an angle A2, which may be, for example, about 15 degrees. A distance 492 between the outermost portions of a periphery of the upper wall 472 as shown in FIG. 4C may be, for example, in a range of from about 65.50 mm to about 65.62 mm. A distance 496 between the outermost portions of the second end 101 of the cylindrical body 102 and between outermost end portions of the bottom ledge 470 as shown in FIG. 4C may be, for example, in a range of from about 82.72 mm to about 82.78 mm.

FIG. 4C further illustrates a line 4D-4D, and FIG. 4D illustrates a cross-sectional view of the piston ring feeder 100' taken along the line 4D-4D of FIG. 4C. The top surface 480 defined between the inner wall 108 and the outer periphery wall 106 of the first end 103 of the cylindrical body 102 is shown. A length 482 between the top surface 480 and the inner ridge 95 is also shown, which length 482 may be, for example, in a range of from about 24.51 mm to about 24.54 mm. A width 484 between the first projection feature 114 and the second projection feature 112' is shown, which width 484 may be, for example, in a range of from about 81.25 mm to about 81.28 mm.

FIG. 4D also illustrates a length 490 between a top ridge 96 of the bracket portion of the outer periphery wall 106 of the cylindrical body 102 and the bottom ledge 470. The length 490 may be in the range of from about 111.50 mm to 111.55 mm. The cylindrical body 102 may include one or more apertures 90 aligned with the aperture 92A that may respectively have a diameter of, for example, about 12.70 mm. A center of the aperture 90 may be spaced a width 91 away from a central Y-axis of the cylindrical body 102 through the center point 400, which width 91 may be, for example, about 15.00 mm. The center of the aperture 90 may further be spaced a width 478 away from an outermost end portion of the bottom ledge 470, which width 478 may be, for example, in a range of from about 39.87 mm to about 39.98 mm. It is to be understood that dimensions of embodiments of the piston ring feeders described herein may be adjusted and/or scaled as appropriate to those of ordinary skill in the art.

Figure 4E:
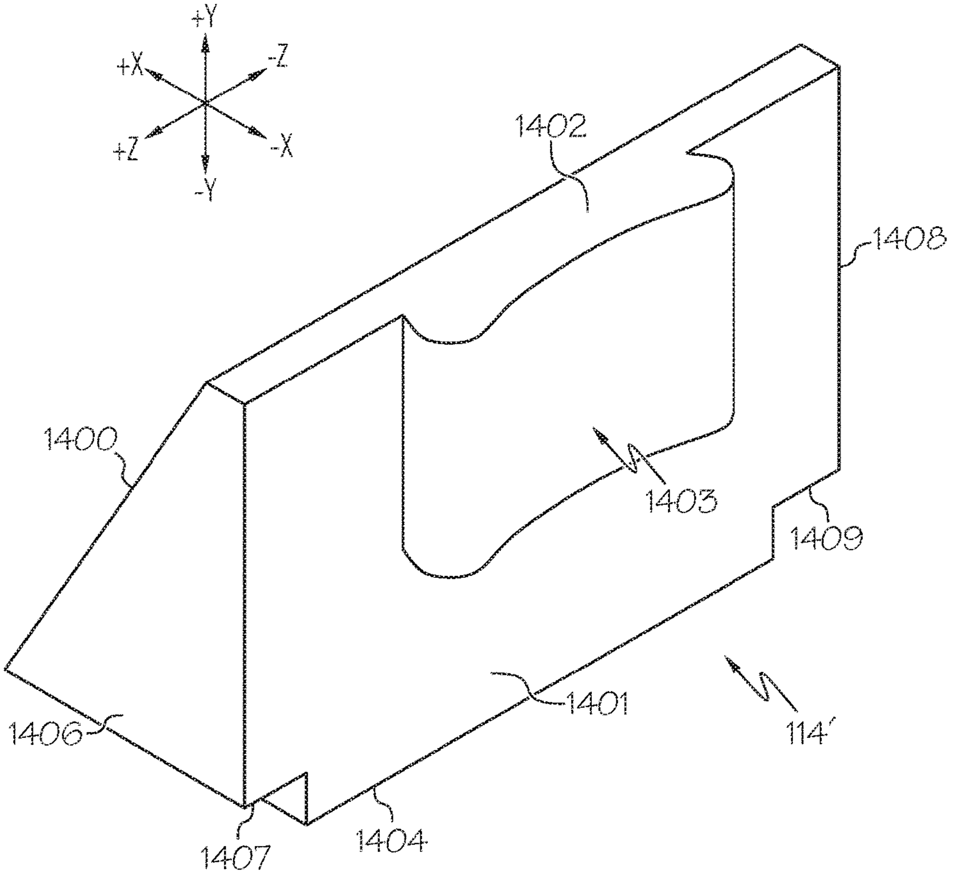
FIG. 4E schematically illustrates another embodiment of an attachable front projection feature for use with the piston ring feeder of FIG. 4A incorporating a bolt-on design, according to one or more embodiments shown and described herein.

FIG. 4E illustrates a first projection feature 114' as another embodiment of the first projection feature 114. The first projection feature 114' may be bolted onto the first end 103 of the cylindrical body 102 at the location shown as the first projection feature 114 in FIG. 4A, for example. The first projection feature 114' includes a front tapered surface 1400, a rear surface 1401, a top surface 1402, a bottom surface 1404, and sides surfaces 1406, 1408. The side surfaces 1406, 1408 are disposed between the front tapered surface 1400 and the rear surface 1401. The rear surface 1401 includes a rear protrusion 1403. Inwardly-directed ledges 1407, 1409 that extend toward a center of the first projection feature 114' and are respectively disposed below side surfaces 1406, 1408, and the ledges 1407, 1409 and side surfaces 1406, 1408 are disposed between the top surface 1402 and the bottom surface 1404.

Figure 5B:
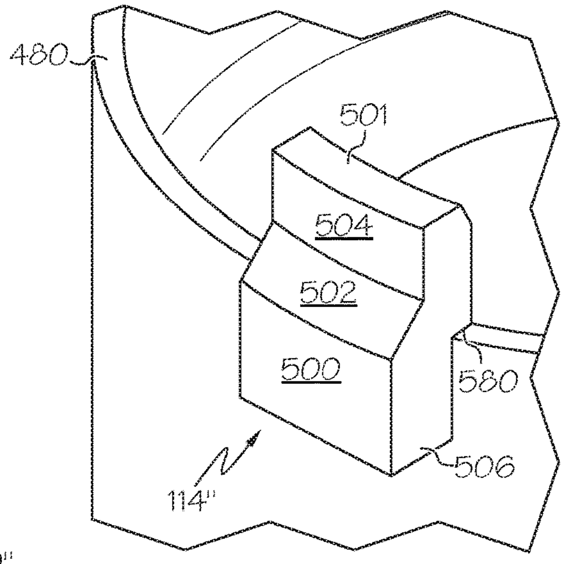
FIG. 5B schematically illustrates a detail view of a portion of the piston ring feeder in area 5B of FIG. 5A including the front projection feature, according to one or more embodiments shown and described herein.
Figure 5A:
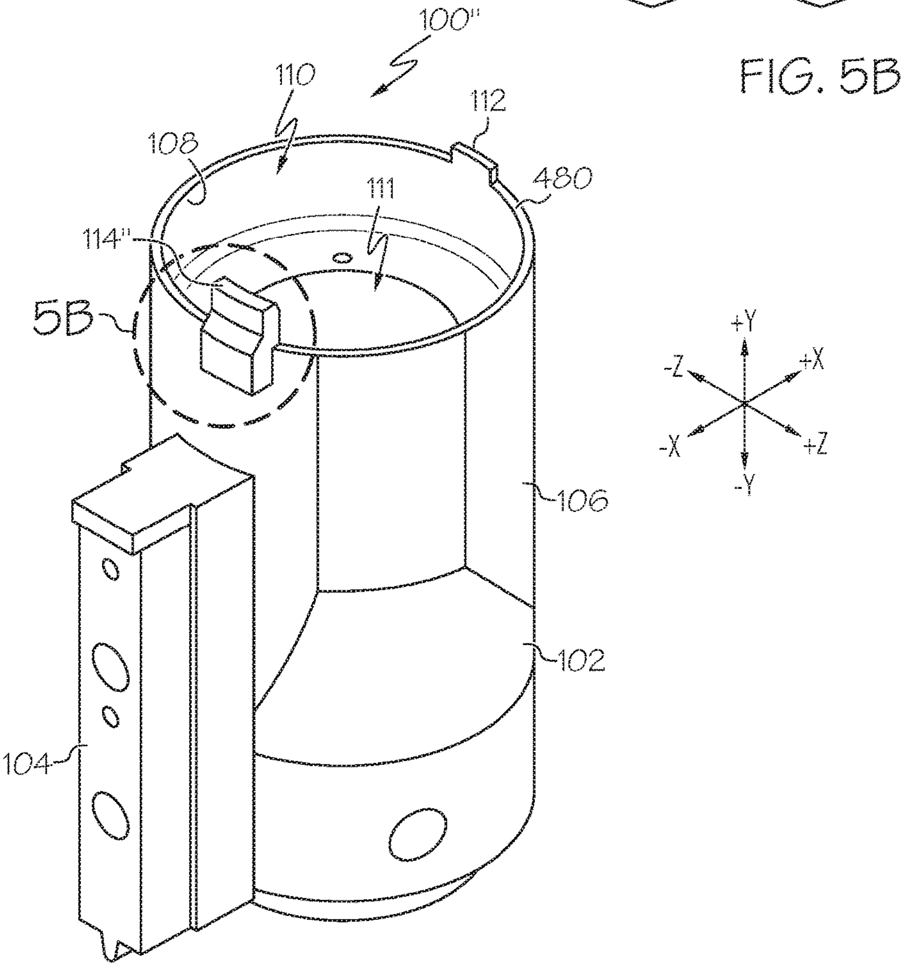
FIG. 5A schematically illustrates an isometric view of another piston ring feeder having another front projection feature incorporating a magnetic connection design, a rear projection feature, and an attached mounting bracket, according to one or more embodiments shown and described herein.

FIG. 5A illustrates another embodiment of a piston ring feeder 100" including a first projection feature 114" instead of the first projection feature 114 of FIG. 3 and the second projection feature 112 of FIG. 1. In some embodiments, the first projection feature 114" may slide over or otherwise be connected to or replace the first projection feature 114. It is to be understood that any arrangement or combination of the embodiments of the first and second projection features described herein are within the scope of the disclosure.

FIG. 5B shows a detail view of the first projection feature 114" attached to, seated against, and abutting the first end 103 of the cylindrical body 102 of the piston ring feeder 100". The first projection feature 114" in FIG. 5B includes a top surface 501, a lower front surface 500, an intermediate front surface 502, an upper front surface 504, and a first side surface 506. A lip portion 580 extending inwardly from a lower end of an intermediate rear surface 602 (FIG. 6) of the first projection feature 114" is seated against the top surface 480 of the cylindrical body 102.

Figure 6:
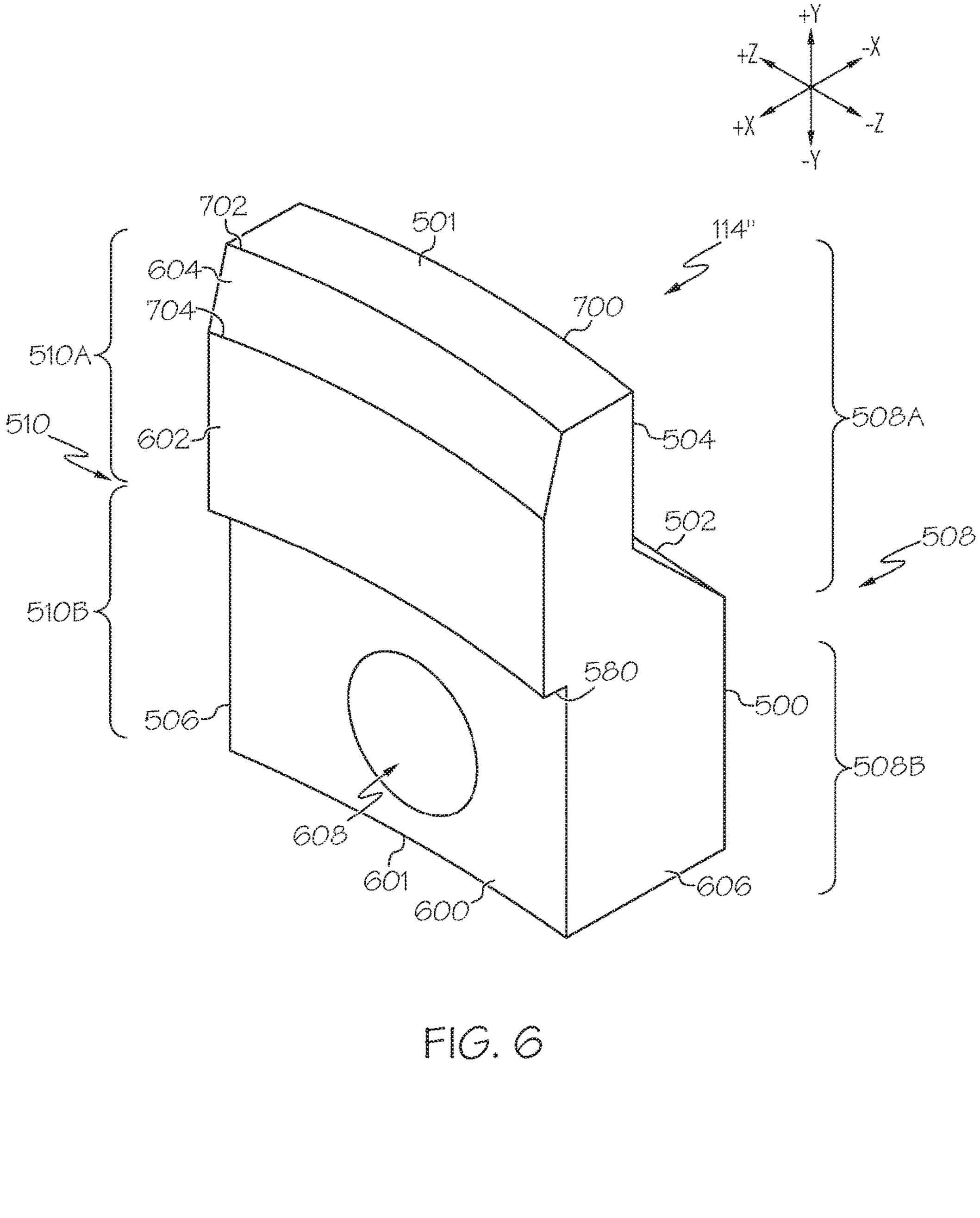
FIG. 6 schematically illustrates a rear, perspective view of the front projection feature of FIG. 5A, according to one or more embodiments shown and described herein.

FIG. 6 shows a rear-to-front isometric view of the first projection feature 114" in isolation having a lower rear surface 600, the intermediate rear surface 602, and a upper rear surface 604. The intermediate rear surface 602 and the upper rear surface 604 are separated by a dividing ledge 704. A second side surface 606 is shown that is disposed between a bottom surface 601 and the top surface 501. The top surface 501 and the upper rear surface 604 are separated by a dividing ledge 702. Further, the top surface 501 and the upper front surface 504 are separated by a dividing ledge 700. The first projection feature 114" includes a front portion 508 and a rear portion 510. For example, a top front portion 508A includes the intermediate front surface 502 that is inwardly tapering toward the top surface of the first projection feature and the upper front surface 504 that is flat, and a bottom front portion 508B includes the lower front surface 500 that is flat. A top rear portion 510A includes the intermediate rear surface 602 that is flat and the upper rear surface 604 that is inwardly tapering toward the top surface of the first projection feature, and a bottom rear portion 510B includes the lower rear surface 600. Such a tapered arrangement of the upper rear surface 605 can increase the width of a gap between the first projection feature 114" and a piston located in the piston ring feeder 100", as will described in greater detail below. The lower rear surface 600 further includes an blind bore 608 that may be, for example, an opening for a magnet also represented by 608 that attaches the first projection feature 114" to the cylindrical body 102.

Figure 7:
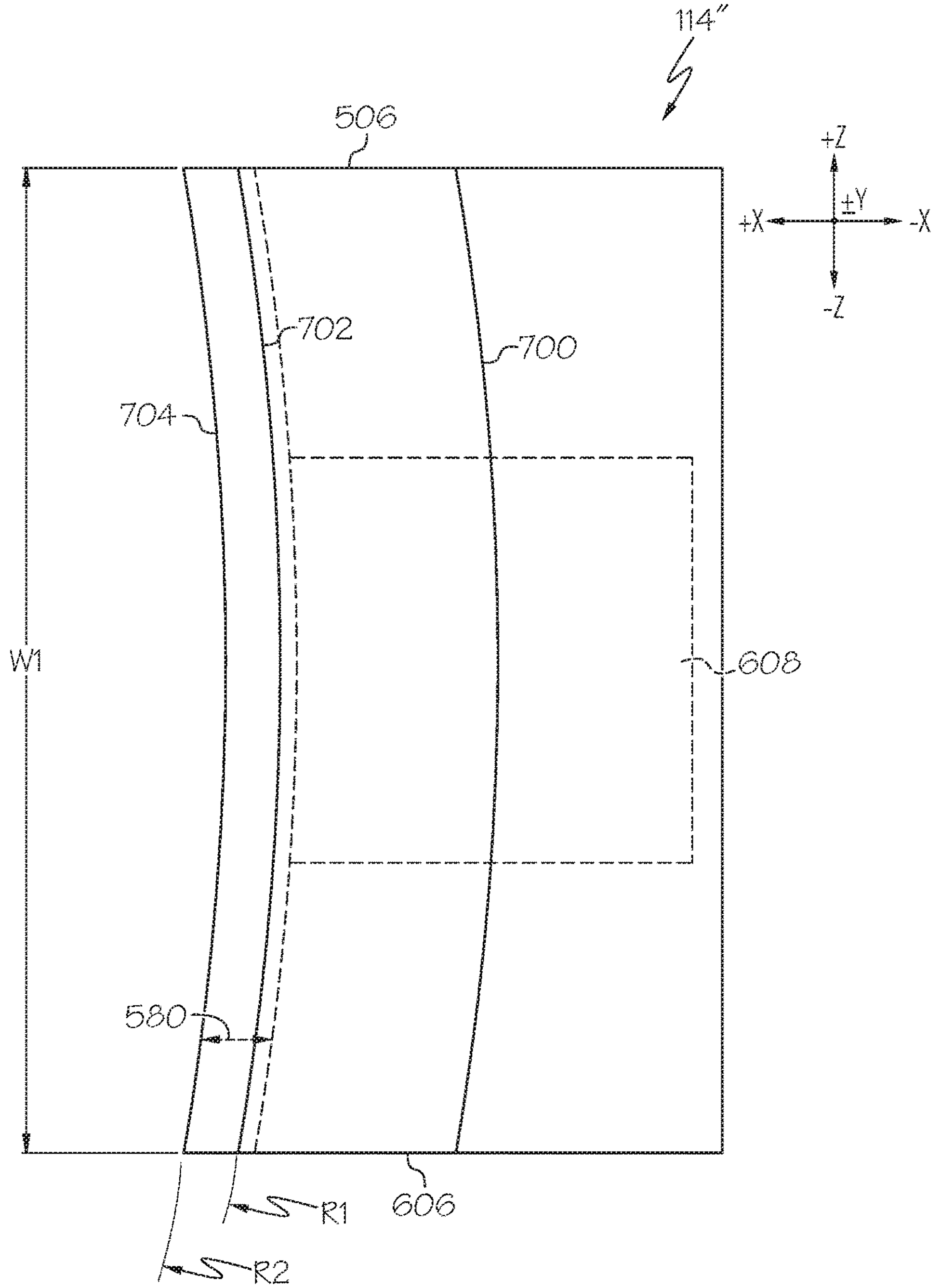
FIG. 7 schematically illustrates a top plan view of the front projection feature of FIG. 6, according to one or more embodiments shown and described herein.

FIG. 7 illustrates a top plan view of the first projection feature 114". The dividing ledges 700, 702, and 704 are curved. For example, dividing ledges 702, 704 have respective radius of curvatures R1, R2. Radius of curvature R1 may be, for example, about 43.80 mm, and radius of curvature R2 may be, for example, about 43.00 mm. The first projection feature 114" further includes a width W1 extending between the first and second side surfaces 506, 606. Width W1 may be, for example, about 15.0 mm.

Figure 8:
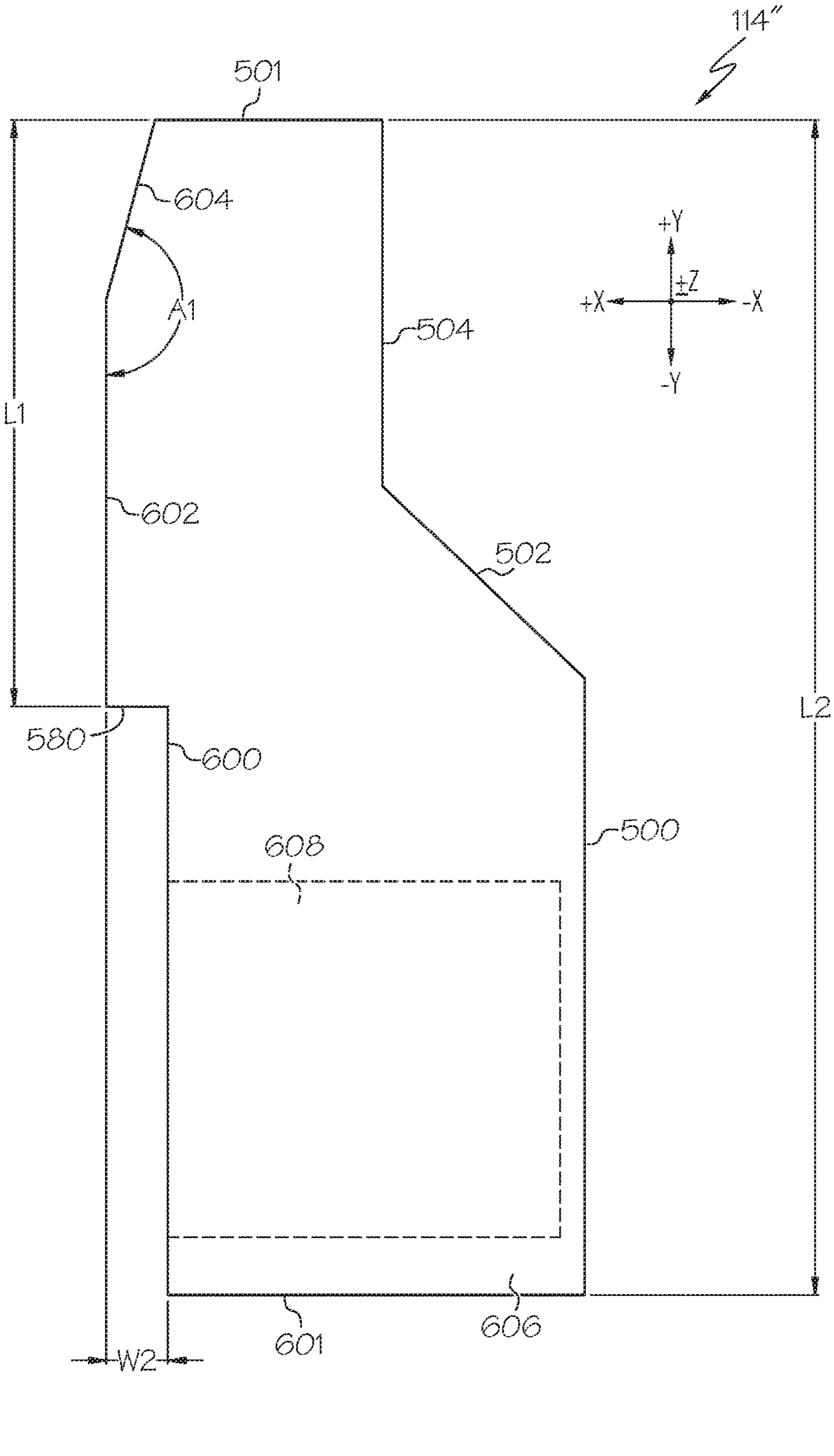
FIG. 8 schematically illustrates a side elevation view of the front projection feature of FIG. 6, according to one or more embodiments shown and described herein.

FIG. 8 illustrates a side elevation view of the first projection feature 114" facing the second side surface 606. A length L1 is defined between the intermediate rear surface 602 and the upper rear surface 604 and may be, for example, 10.0 mm. An angle A1 between the intermediate rear surface 602 and the upper rear surface 604 may be, for example, an obtuse angle of about 165.0 degrees. The lip portion 580 has a width W2 that may be, for example, 1.00 mm. The lower front surface 500, the intermediate front surface 502, and the upper front surface 504, may have a combined length L2 that may be, for example, 20 mm.

FIGS. 9A-14 front and rear views of the piston ring feeder 100" during a method of applying a first piston ring 202 of a plurality of rings 202' within a piston groove 206 of a piston 200 that is fed into the piston ring feeder 100". While the disclosure herein with respect to FIGS. 9A-14 describes a method of using the piston ring feeder 100" including the first projection feature 114" and the second projection feature 112, use of the method with other embodiments of piston ring feeds, such as those having other embodiments of the first projection feature and/or the second projection feature, are considered to be within the scope of this disclosure.

Figure 9A:
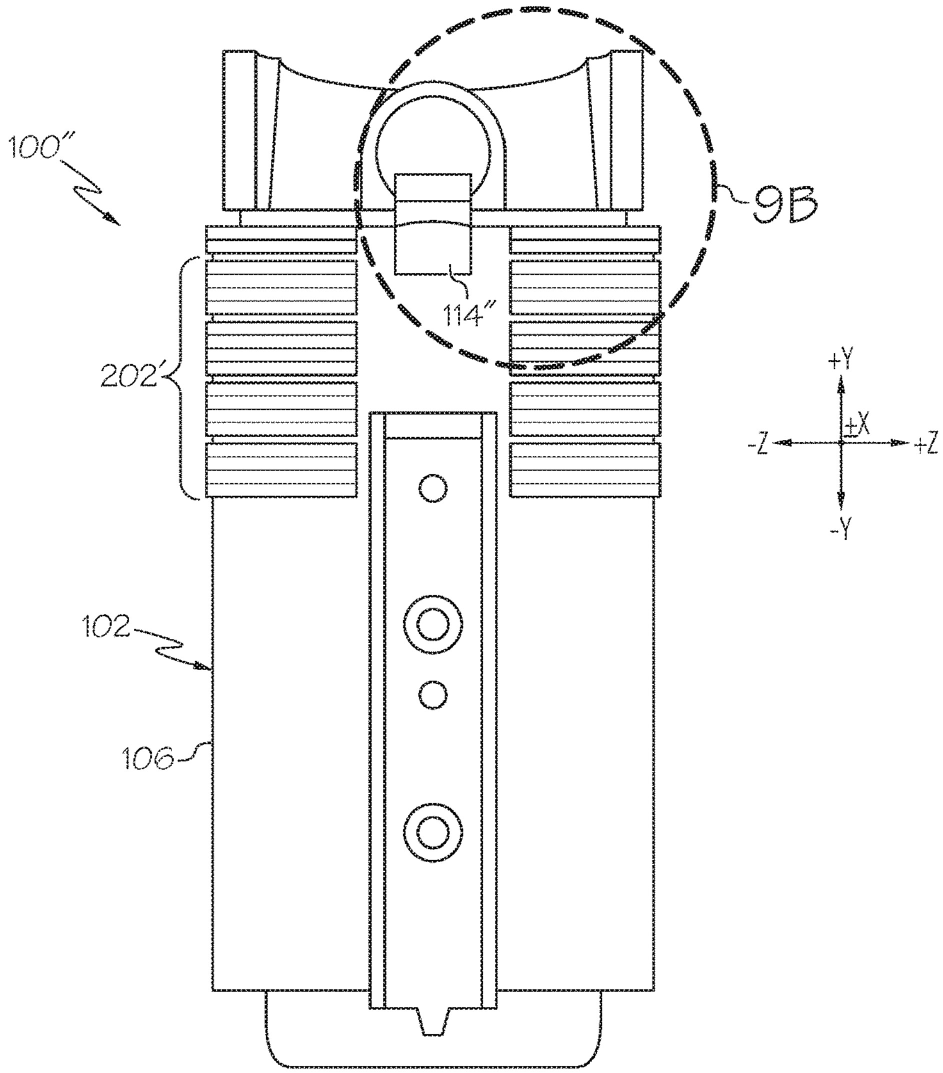
FIG. 9A schematically illustrates a front elevation view of the piston ring feeder of FIG. 5A and the piston of FIG. 2A, according to one or more embodiments shown and described herein.
Figure 9B:
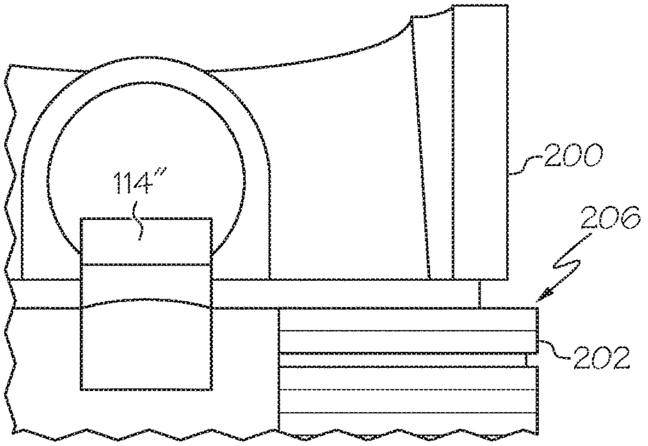
FIG. 9B schematically illustrates a detail view of a portion of the piston ring feeder in area 9B of FIG. 9A showing the front projection feature before the piston ring is fed into a piston groove by the piston ring feeder, according to one or more embodiments shown and described herein.
Figure 10A:
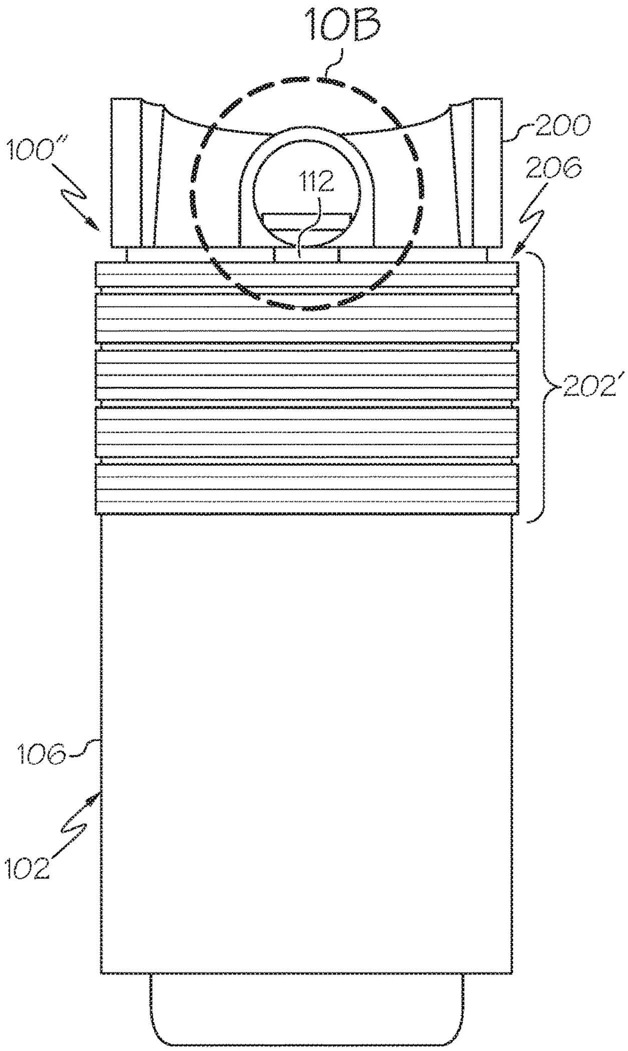
FIG. 10A schematically illustrates a rear elevation view of the piston ring feeder of FIG. 5A and the piston of FIG. 2A, according to one or more embodiments shown and described herein.
Figure 10B:
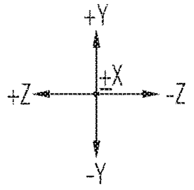
FIG. 10B schematically illustrates a detail view of a portion of the piston ring feeder in area 10B of FIG. 10A showing the rear projection feature before the piston ring is fed into a piston groove by the piston ring feeder, according to one or more embodiments shown and described herein.
Figure 10B:
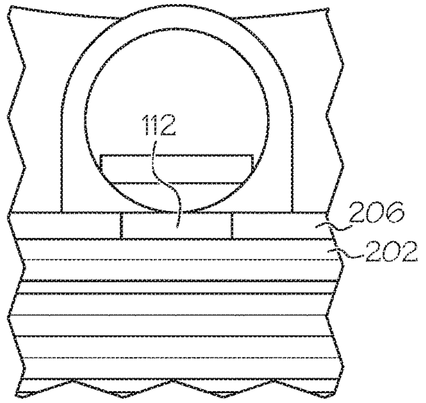

FIGS. 9A-10B illustrate when the piston 200 is placed into the piston receiving aperture 110 of the cylindrical body 102 until the piston groove 206 of the piston 200 is seated between the first and second projection features 114", 112 that have respective top surfaces that extend above the piston groove 206, and the piston groove 206 is disposed above the piston ring 202. For example, FIG. 9A illustrates a front elevation view of the piston ring feeder 100" of FIG. 5A, and FIG. 9B illustrates a detail view of a portion of the piston ring feeder 100" showing the first projection feature 114" before the piston ring 202 is fed into the piston groove 206 by the piston ring feeder 100". FIG. 10A illustrates a rear elevation view of the piston ring feeder 100" of FIG. 5A, and FIG. 10B illustrates a detail view of a portion of the piston ring feeder 100" showing the second projection feature 112 before the piston ring 202 is fed into the piston groove 206 by the piston ring feeder 100".

Figure 11:
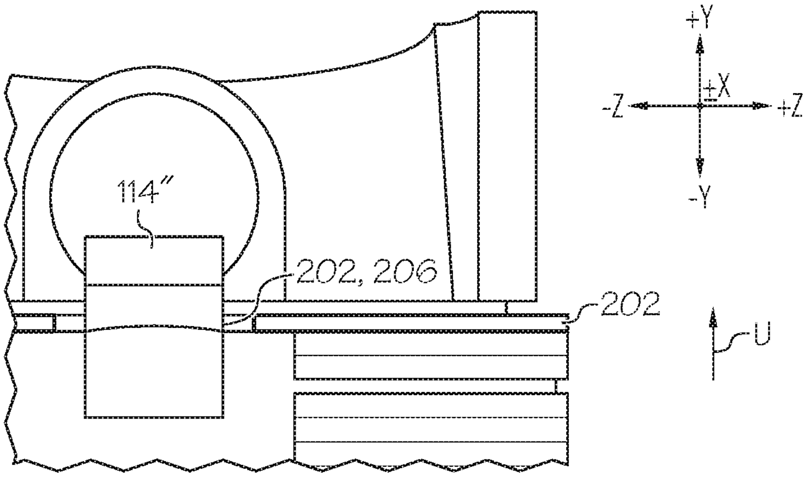
FIG. 11 schematically illustrates a detail view of a portion of the piston ring feeder of FIG. 9A showing the front projection feature when the piston ring is fed into a piston move by the piston ring feeder.
Figure 12:
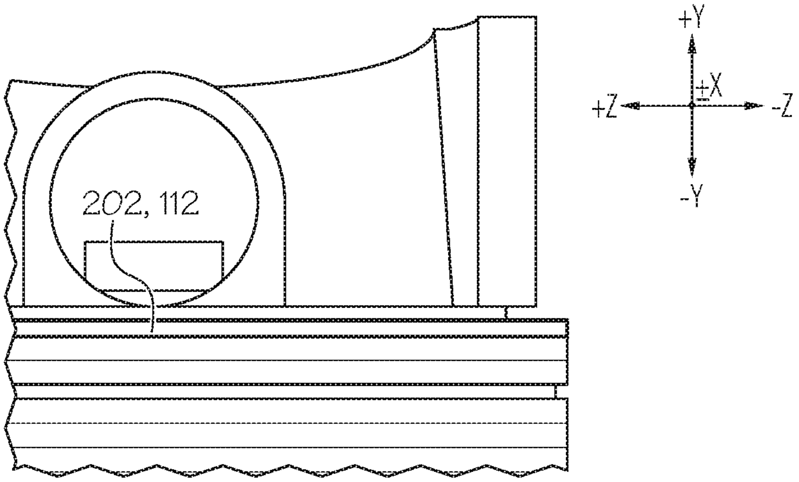
FIG. 12 schematically illustrates a detail view of a portion of the piston ring feeder of FIG. 10A showing the rear projection feature when the piston ring is fed into a piston groove by the piston ring feeder and is held out partially by the rear projection feature.

The plurality of rings 202' are raised, such that the first piston ring 202 is raised, by a raising mechanism in an upward direction by, for example, a motor or other linear actuator as represented by arrow U in FIG. 11. As the first piston ring 202 rides upward on the piston ring feeder 100", the piston ring 202 contacts and/or has at least one of ends 202A, 202B spaced from first and second side surfaces of 506, 606 of the first projection feature 114". The raising mechanism may be, for example, a motor and a sensor assembly. The piston ring 202 is raised until the piston ring 202 partially snaps into the piston groove 206 as shown in FIGS. 11-12 such that at least one of the ends 202A, 202B are behind and/or trapped by the first projection feature 114" (FIG. 11) and the piston ring 202 is held out partially by and is wrapped around an exterior, front portion of the second projection feature 112 (FIG. 12).

Figure 13:
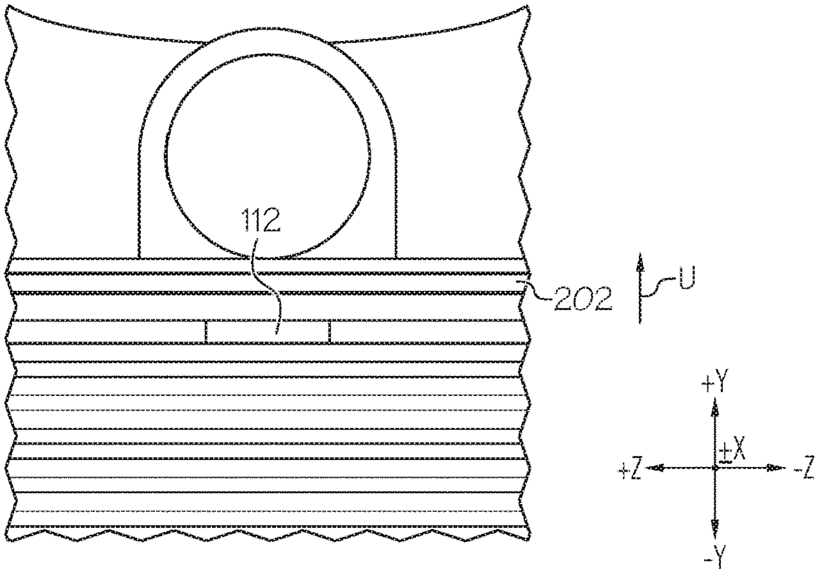
FIG. 13 schematically illustrates a detail view of a portion of the piston ring feeder of FIG. 9A showing the rear projection feature after the piston ring is fed into a piston groove by the piston ring feeder and is pulled off the rear projection feature as the piston is raised.
Figure 14:
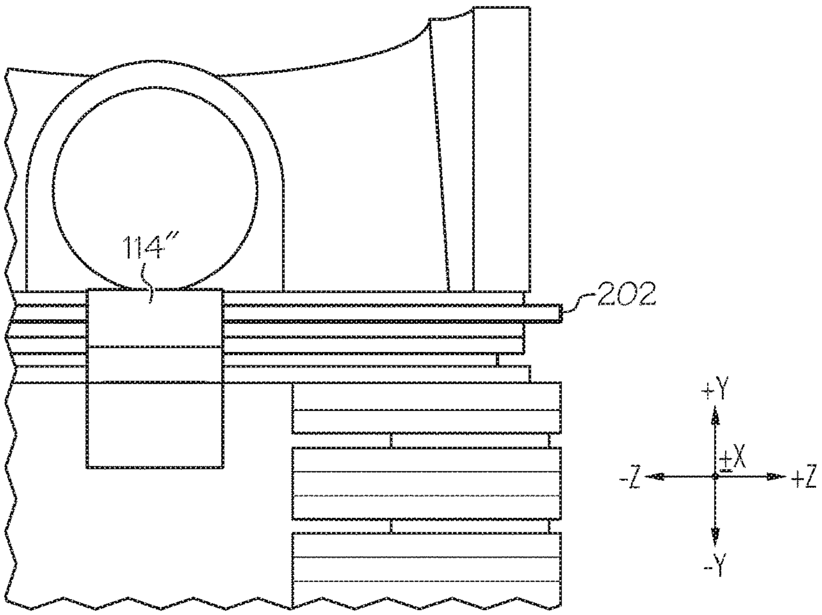
FIG. 14 schematically illustrates a detail view of a portion of the piston ring feeder of FIG. 10A showing the front projection feature after the piston ring has been pulled off the rear castle as the piston is raised and has split ends trapped by the front projection feature.

As the piston 200 is raised in FIGS. 13-14, the piston ring 202 pulls off the second projection feature 112 (FIG. 13) to snap into the piston groove 206 at an associated portion of the piston groove 206. The second projection feature 112 had previously prevented the piston ring 202 from contacting the associated portion of the piston groove 206. Any taper of the second projection feature 112 can allow for some gradual diameter reduction of the piston ring 202, as the piston ring 202 rises off the second projection feature 112. Such a gradual reduction in diameter of the piston ring 202 result in a reduction of force when the piston ring 202 is pulled off the second projection feature 112 than would otherwise occur with a larger piston ring diameter, thus reducing the force applied by a whip lash effect that affects the ends 202A, 202B. For example, as the piston ring 202 falls off the second projection feature 112 in FIG. 13, the front portion of the piston ring 202 with ends 202A, 202B may attempt to "whip lash," but ends 202A, 202B are prevented from overlapping by the first projection feature 114". Thus, the first projection feature 114" traps ends 202A, 202B of the piston ring 202 during the whip lash movement to prevent overlap of the ends 202A, 202B. For example, the piston ring 202 is trapped against and/or behind an interior, rear portion (e.g., the upper rear surface 604) of the first projection feature 114" and fully snaps into the piston groove 206 with no overlap of ends 202A, 202B of the piston ring 202.

Figure 15A:
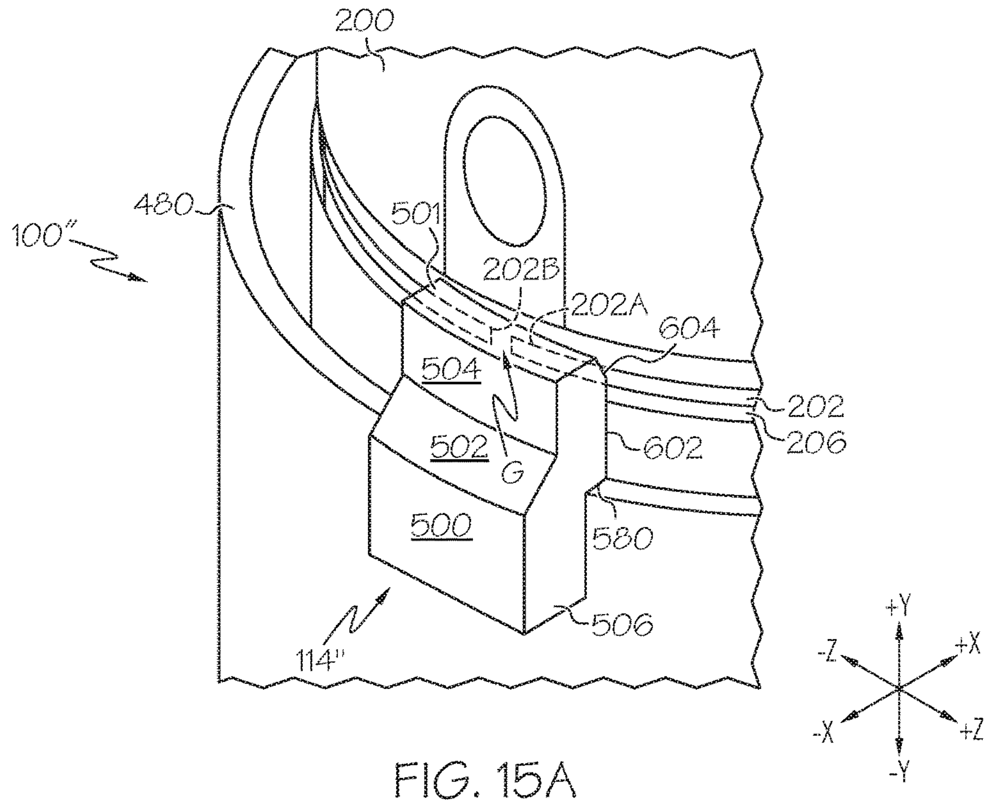
FIG. 15A schematically illustrates a detail top, isometric view of the piston ring feeder of FIG. 10A after the split ends of the piston ring are trapped behind the front projection feature and do not overlap.
Figure 15B:
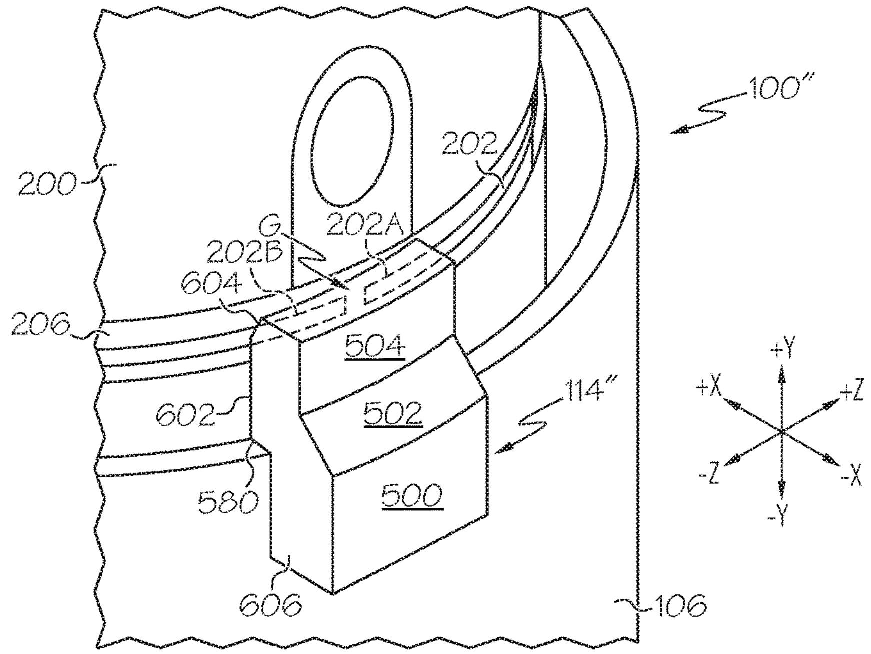
FIG. 15B schematically illustrates another detail top, isometric view of the piston ring feeder of FIG. 10A, from a different perspective than the piston ring feeder of FIG. 15A, after the split ends of the piston ring are trapped behind the front projection feature and do not overlap.

Referring to FIG. 15A, for example, a detail top, isometric view of the piston ring feeder 100" is shown with the ends 202A, 202B of the piston ring 200 trapped behind the front projection feature 114". The ends 202A, 202B do not overlap and are separated by an end gap G. FIG. 15B schematically illustrates another detail top, isometric view of the piston ring feeder 100" from a different perspective showing the ends 202A, 202B of the piston ring 202 being trapped behind the front projection feature 114" and not overlapping.

Overall, while the piston 202 has been raised up in the direction of arrow U such that ends 202A, 202B are spaced apart and seated in the piston groove 206 (FIG. 11) and the piston ring 202 is held out partially by the exterior, front portion of the second projection feature 112 (FIG. 12), the ends 202A, 202B in the piston groove 206 ride behind the top rear portion 510A of the front projection feature 114". For example, the ends 202A, 202B ride behind the intermediate rear surface 602 (FIGS. 15A-15B) in a gap between the piston groove 206 and the intermediate rear surface 602. The ends 202A, 202B in the piston groove 206 continue ride up behind the top rear portion 510A of the front projection feature 114" from the intermediate rear surface 602 to the tapering upper rear surface 604.

Referring to FIGS. 15A-15B, the tapering upper rear surface 604 allows for a greater gap width to exist between the piston 200 and the front projection feature 114". As the piston ring 202 falls off the second projection feature 112 (FIG. 13), the front portion of the piston ring 202 with ends 202A, 202B (FIGS. 14-15B) attempts to "whip lash." The ends 202A, 202B should previously be spaced a sufficient distance apart such that when the piston ring 202 falls off the second projection feature 112, the piston ring 202 snapping into the piston groove 206 has sufficient room to reduce in diameter such that ends 202A, 202B may remain separated and trapped by the front projection feature 114". For example, referring to FIGS. 15A-15B, the ends 202A, 202B are trapped and ride up along the greater gap width between the tapering upper rear surface 604 of the front projection feature 114" and the piston 200, which greater gap width provides for an additional release space for the whip lash effect of the piston ring 202. The ends 202A, 202B may "whip" against and between the tapering upper rear surface 604 and the piston groove 206 until the ends 202A, 202B are settled into and fully seated within the piston groove 206 and are spaced apart by the end gap G (FIGS. 15A-15B) and, thus, are prevented from overlapping by the first projection feature 114". The piston 200 continues to be raised in the upward direction of arrow U until the piston groove 206, having a fully seated, non-overlapping piston ring 202, is eventually disposed above the first projection feature 114" and the second projection feature 112.

Thus, in embodiments described herein, a rear projection feature having a height and/or tapering may help reduce overlapping of split ends of piston rings when being seated in piston grooves of pistons that may otherwise occur via a whip lash effect when a portion of an expander piston ring is pulled from a projection feature atop a piston ring feeder. Further, a front projection feature may have a height and help reduce the whip lash effect and may operate to trap the split ends of the expander piston ring when the expander piston ring is pulled off the rear projection feature such that overlapping of the split ends within the piston groove is prevented while the whip lash effect occurs. Thus, expander piston rings may be fully seated within respective piston grooves by use of the piston ring feeders described herein while split ends of the expander piston rings are prevented from overlapping such that failure of the piston assembly within the engine is prevented.

It is noted that the terms "substantially" and "about" and "approximately" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A piston ring feeder comprising:

a first end and a second end and a cylindrical body disposed therebetween, wherein at least a portion of the cylindrical body tapers upward and outward in a direction from the second end toward the first end;

a pair of projection features including a first projection feature and a second projection feature, each having portions protruding from and attachable to the first end, and each disposed at a respective area along opposite half portions of the piston ring feeder; and a piston receiving aperture defined by an inner wall of the first end, wherein a top surface of the first end is defined between the inner wall and an outer periphery wall of the first end and is disposed below a respective top surface of each of the pair of projection features.

2. The piston ring feeder of claim 1, wherein the first projection feature is disposed on a front portion of the piston ring feeder and attaches to the first end of the piston ring feeder via a magnetic mechanism.

3. The piston ring feeder of claim 2, wherein:

the first projection feature comprises a top surface, a bottom surface, a front portion, a rear portion, and a pair of side surfaces, and the front portion, the rear portion, and the pair of side surfaces extend between the top surface and the bottom surface of the first projection feature.

4. The piston ring feeder of claim 3, wherein:

the rear portion of the first projection feature includes a top rear portion and a bottom rear portion, the top rear portion includes a flat intermediate rear surface and an inwardly tapering upper rear surface disposed above the flat intermediate rear surface, and the bottom rear portion defines a blind bore configured to receive a magnet to attach the first projection feature to the first end of the piston ring feeder, and the top rear portion and the bottom rear portion are separated by a lip such that the top rear portion projects rearwardly of the bottom rear portion and away from the front portion of the first projection feature.

5. The piston ring feeder of claim 4, wherein the lip comprises a seat to be disposed on and abut against the top surface of the first end of the piston ring feeder.

6. The piston ring feeder of claim 3, wherein:

the front portion of the first projection feature includes a top front portion and a bottom front portion, the top front portion includes an inwardly tapering intermediate front surface and a flat upper front surface disposed above the inwardly tapering intermediate front surface, and the bottom front portion defines a flat lower front surface.

7. The piston ring feeder of claim 3, wherein:

the top surface of the first projection feature comprises a front curved dividing ledge associated with the front portion and a rear curved dividing ledge associated with the rear portion; and the rear portion of the first projection feature comprises a top rear portion separated from a bottom rear portion by a curved dividing ledge.

8. The piston ring feeder of claim 1, wherein the first projection feature is disposed on a front portion of the piston ring feeder in a first position and the second projection feature is disposed on a rear portion of the piston ring feeder in a second position that is opposite the first position.

9. The piston ring feeder of claim 8, wherein opposite side walls of a top portion of the second projection feature are upwardly tapered toward a center wall top portion of the second projection feature.

10. The piston ring feeder of claim 1, wherein the first projection feature is disposed on a front portion of the piston ring feeder and the second projection feature is disposed on a rear portion of the piston ring feeder.

11. The piston ring feeder of claim 1, wherein the piston ring feeder further comprises a mounting bracket attached to a bracket portion of the cylindrical body to mount the piston ring feeder to a piston ring feeder holding assembly.

12. The piston ring feeder of claim 1, wherein the first projection feature is disposed on a front portion of the piston ring feeder and attaches to the first end of the piston ring feeder via a bolt mechanism.

13. A piston ring feeder comprising:

a first end and a second end and a cylindrical body disposed therebetween, wherein at least a portion of the cylindrical body tapers upward and outward in a direction from the second end toward the first end;

a rear projection feature has a portion protruding from and attachable to the first end and is disposed at an area along a rear half portion of the piston ring feeder, wherein the rear projection feature is upwardly tapered; and a piston receiving aperture defined by an inner wall of the first end, wherein a top surface of the first end is defined between the inner wall and an outer periphery wall of the first end and is disposed below a top surface of the rear projection feature.

14. The piston ring feeder of claim 13, further comprising:

a front projection feature disposed opposite the rear projection feature, wherein the top surface of the first end is disposed below a top surface of the front projection feature.

15. A method for installing a piston ring onto a piston, the method comprising:

disposing one or more piston rings on an outer periphery wall of a piston ring feeder, wherein the piston ring feeder comprises:

a first end and a second end and a cylindrical body disposed therebetween, wherein the cylindrical body includes the outer periphery wall and at least a portion of the cylindrical body tapers upward and outward in a direction from the second end toward the first end, a pair of projection features including a first projection feature and a second projection feature, each having portions protruding from and attachable to the first end, and each disposed at a respective area along opposite half portions of the piston ring feeder, and a piston receiving aperture defined by an inner wall of the first end, wherein a top surface of the first end is defined between the inner wall and the outer periphery wall of the first end and is disposed below a respective top surface of each of the pair of projection features;

receiving an end of the piston comprising a piston groove into the piston receiving aperture until the piston groove is disposed above the one or more piston rings and below the respective top surface of each of the pair of projection features;

raising at least a first piston ring of the one or more piston rings until the first piston ring partially snaps into the piston groove such that a first end and a second end of the first piston ring are separated by the first projection feature and a second portion of the first piston ring is wrapped around an exterior portion of the second projection feature;

raising the piston such that the second portion of the first piston ring is pulled away from and off the exterior portion of the second projection feature while the first projection feature continues to separate the first and second ends of the first piston ring; and raising the piston such that the first projection feature releases the first and second ends of the first piston ring such that the first piston ring fully snaps into the piston groove to form an end gap defined between the first and second ends of the first piston ring seated in the piston groove.

16. The method of claim 15, wherein the first projection feature is disposed on a front portion of the piston ring feeder and the second projection feature is disposed on a rear portion of the piston ring feeder, opposite the front portion of the piston ring feeder.

17. The method of claim 15, wherein the first projection feature comprises a front portion and a rear portion, the rear portion comprising top rear portion, the top rear portion comprising an intermediate rear surface and an upper rear surface, wherein the upper rear surface tapers in a direction from the rear portion to the front portion, further comprising:

raising the piston such that the first and second ends of the first piston ring ride up and behind the top rear portion of the first projection feature, and trapping the first and second ends of the first piston ring between a width between the upper rear surface and the piston that is greater than a width between the intermediate rear surface and the piston when the first projection feature releases the first and second ends of the first piston ring to fully snap into the piston groove.

18. The method of claim 15, wherein the piston ring feeder further comprises a mounting bracket attached to a bracket portion of the cylindrical body to mount the piston ring feeder to a piston ring feeder holding assembly.

19. The method of claim 15, wherein opposite side walls of a top portion of the second projection feature are upwardly tapered toward a center wall top portion of the second projection feature.

20. The method of claim 15, wherein the portion of the cylindrical body tapers upward and outward in the direction from the second end toward the first end of the cylindrical body at an angle of about 2 degrees.

* * * * *